Patented June 15, 1943

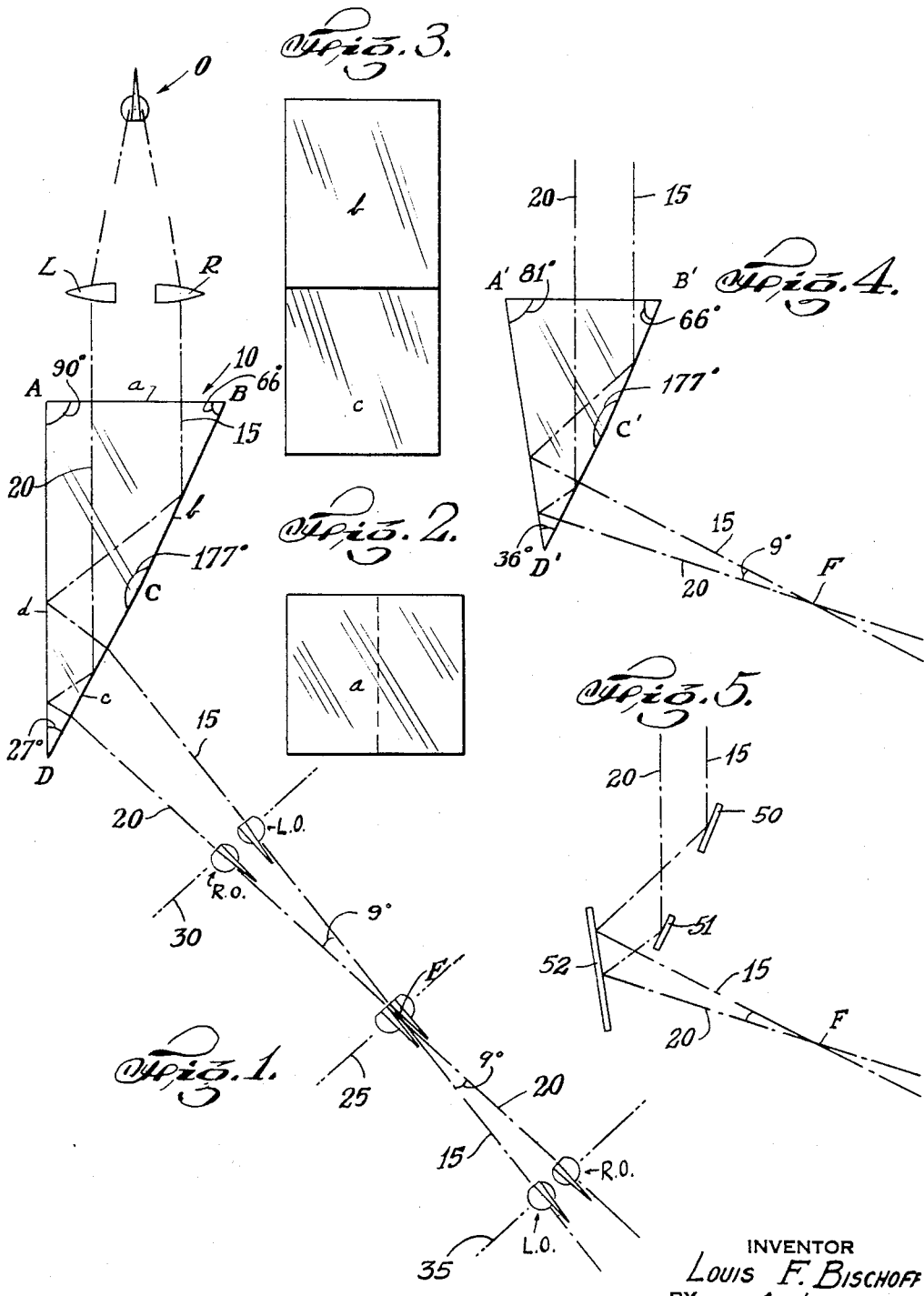

2,321,894

UNITED STATES PATENT OFFICE 2,321,894

LENS AND PRISM SYSTEM

Louis F. Bischoff, Brooklyn, N. Y.

Application October 4, 1940, Serial No. 359,748

11 Claims. (Cl. 88—29)

This invention relates generally to optical systems. More particularly my invention relates to an optical system having an improved prism construction or the like arrangement of reflecting surfaces adapted for stereoscopic work.

It is well known that in order to view an object stereoscopically it is necessary to view the said object simultaneously from two different viewing points. When a person with normal vision views an object simultaneously with both eyes, each eye sees the object from a different viewing point and therefore there is registered on the retina of each eye a different image of the same object. In normal vision the brain merges the two different images seen by each eye into one image and an impression of stereoscopic relief is obtained.

Heretofore when attempts have been made to obtain a stereoscopic relief effect by photographic means, the ordinary camera with its single lens was replaced by one having two similar lenses mounted in the camera at a distance apart equal to the normal distance between the eyes in the head. In this way two complete different and separated pictures were obtained corresponding to the two images formed on the retina of each eye in normal binocular vision. Having obtained these dissimilar pictures by developing the negative and printing positives therefrom, it was then necessary to devise some mechanical means for merging them into a single picture impression, as in the case of eyes in normal vision. One of such devices used in connection with the two separate pictures taken photographically was the well known stereoscope. Stereoscopes and similar devices have not proven satisfactory in view of certain well known inherent disadvantages.

It is therefore one of the principal objects of my invention to provide an optical system for stereoscopic use in which the disadvantages of the optical systems heretofore employed shall be overcome by dispensing with the necessity for using a stereoscope or any other similar mechanical aid to create an impression of depth, and which shall represent a great advance in the art.

I propose to accomplish this by providing an optical system which shall include a specifically constructed reflecting prism or a similar arrangement of reflecting surfaces, designed to direct a ray of light from an object directly to a point corresponding to one eye and a ray of light from the same object from a different viewpoint directly to a point corresponding to the other eye, the said separate light rays from two different viewing points directed to each eye being maintained independent of each other and directed toward a point of convergence.

Further objects of my invention will become apparent from the following description read in conjunction with the accompanying drawing in which, Fig. 1 is a diagrammatic illustration of an optical system including a prism constructed and arranged in accordance with my invention;

Fig. 2 is an end elevational view thereof as viewed from the end toward the object;

Fig. 3 is a side elevational view thereof as viewed from the right hand side of Fig. 1;

Fig. 4 is a view similar to Fig. 1, but illustrating a modified construction of the prism; and Fig. 5 is a diagrammatic view similar to Figs. 1 and 4, but showing a modified form of my invention.

Referring now in detail to Figs. 1 to 3 of the drawing, I have illustrated the underlying principle of my invention of stereoscopic vision in relation to an object O. A right lens member R and a left lens member L of any suitable well known types generally employed in the art, are suitably positioned with respect to the object O and to a prism 10 specifically constructed in accordance with my invention. The said prism 10 comprises a plane side surface forming an entrant face $a$, designed to have pass therethrough series of rays of light represented by the numerals 15 and 20, emanating from the object O, and passing through the lenses R and L, as shown. The said prism 10 further comprises three reflecting faces $b$, $c$ and $d$. The reflecting face $b$ is so constructed and arranged with respect to the face $a$ as to receive and reflect only the light rays 15, passing through the lens R while the reflecting face $c$ is so constructed and arranged with respect to the faces $a$ and $b$ as to receive and reflect only the light rays 20 passing through the lens L.

It is thus seen that the light rays 15 from the object O as viewed by the lens R (which corresponds to the right eye view of normal vision) and the light rays 20 from the object O as viewed by the lens L (which corresponds to the left eye view of normal vision) are maintained separate and independent.

Due to the specific angular arrangement of the prism faces $b$ and $c$ the light rays 15 and 20 are independently reflected from the said faces $b$ and $c$ respectively to the reflecting face $d$. Due to the specific angular arrangement of the face *d* with respect to the faces *b* and *c* the light rays 15 and 20 are again independently reflected back from the bace *d* and out through a portion of the face *c*, designed to serve as an emergent face for the prism 10, the said light rays being slightly refracted and caused to travel to a point of convergence F.

It is thus seen from the above description that the specific construction and arrangement of the reflecting faces of the prism 10 causes light rays from different viewpoint of an object to pass therethrough and emerge to a point of convergence. In the angular arrangement of faces *b*, *c* and *d* shown in Fig. 1 the subtended angle between the converging light rays 15 and 20 is 9 degrees.

In accordance with my invention I have discovered that only when the faces *b* and *c* are angularly disposed relatively to each other at an angle less than 180 degrees and more than 174 degrees can the most satisfactory results be obtained. In other words, it is noted that if the angle BCD (see Fig. 1) is less than 174 degrees the point of convergence F of the light rays 15 and 20 will fall within the prism 10 or too close thereto to be of practical use, and when the angle BCD is 180 degrees the emergent rays 15 and 20 will converge too far away from the prism, or at infinity.

Within the above described range for the angle BCD, such as for example 177°, I have found that satisfactory results are obtained when the angle ABC is 66 degrees, the angle BAD is 90 degrees and the angle ADC is 27 degrees. However, certain variations in the said angles ABC, BAD and ADC may be permitted without altering the principle of my invention. In Fig. 2 I have shown one such varied form of prism construction in which the angle A'D'C' corresponding to the angle ADC between adjacent faces of the prism 10, has been increased by 9 degrees, thus making the angle A'D'C' 36 degrees and angle B'A'D' 81 degrees. The effect of these angular variations serve merely to swing the point of convergence F to a higher position, as shown without substantially effecting the distance of the said point F from the prism. It is noted that if on the other hand angle D'A'B' is made 99° instead of 90°, an increase of 9°, the angle A'D'C' will be correspondingly decreased from 27° to 18° and the effect would be to swing the point of convergence F, lower than that shown in Fig. 1 or 4.

In Fig. 5 I have shown the same underlying principles of my invention as worked out with an arrangement of individual mirrors or similar reflecting members having reflecting surfaces instead of the prism 10. In this form of my invention the mirror members 50 and 51 correspond to the faces *b* and *c* of the prism 10 and are similarly angularly disposed with respect to each other, while the mirror member 52 corresponds to the face *d* of the prism 10. Neither entrant nor emergent faces are required in this form of my invention. However, instead of the usual mirror member 51 there may be substituted a type of member being translucent and having reflecting properties, such as for example that used in photographic range finders.

As described above, it is noted that the angular relationship between the faces *b* and *c* of the prism 10, or of the mirror members 50 and 51 (more than 174° and less than 180°) are critical and that such angular arrangement may be satisfactorily employed for many practical uses.

One such use may be in a stereoscopic camera in which case a suitable sensitized element may be placed either at 25, 30 or 35 as shown in Fig. 1 of the drawing. If positioned at 25 a superimposed image obtained is made up of the separate R and L lens images which when developed and printed on a suitably treated paper or projected to a surface will give an impression of depth when viewed by the normal human eyes, when held a normal viewing distance from the eyes and without the aid of any special viewing devices. This will be due to the fact that each eye will see only the image corresponding thereto, in the pair of superimposed images. When as shown in Fig. 1 of the drawing the subtended angle between the light rays 15 and 20 is approximately 9 degrees, and the picture made at the converging point 25 is held about 14 inches from the eyes, stereoscopic depth will be seen in the picture by the naked eyes without any mechanical aids such as a stereoscope.

I have found that from a practical standpoint the best results from a photographic point of view, are obtained when the included angle between the converging light rays 15 and 20 lies in the range of from approximately 9 degrees to 18 degrees.

If the sensitized element is placed at either 30 or 35 a pair of pictures will result, the image R—O representing that seen by the lens L (corresponding to the left eye) and the image L—O representing that seen by the lens R (corresponding to the right eye).

The optical system of my invention may also be employed in any other desired embodiment or it may be used where stereoscopic images or stereoscopic vision is desired.

It will thus be seen that there is provided a device in which the objects of my invention are achieved, and which is well adapted to meet the conditions of practical use.

As various possible embodiments might be made of the above invention, and as various changes might be made in the embodiments above set forth, it is understand that all matter herein set forth or shown in the accompanying drawing is to be interpreted as illustrative and not in a limiting sense.

Having described my invention, I claim as new and desire to secure by Letters Patent:

1. In a stereoscopic system of the character described, that improvement which comprises providing a prism having an entrant face for receiving therethrough light rays from an object, a first reflecting face and a second reflecting face for dividing and reflecting the light rays passing through said entrant face, said second face being disposed at an angle of from approximately 174 degrees to less than 180 degrees to said first reflecting face and a third reflecting face for receiving and reflecting the light rays reflected from said first and second faces, said third face being disposed at approximately 18 degrees to 36 degrees to said second face.

2. In a stereoscopic system of the character described, that improvement which comprises providing a prism having an entrant face for receiving therethrough light rays from an object, a first reflecting face and a second reflecting face for dividing and reflecting the light rays passing through said entrant face, said second face being disposed at an angle of from approximately 174 degrees to less than 180 degrees to said first reflecting face and a third reflecting face for receiving and reflecting the light rays reflected from said first and second faces, said third face being disposed at an acute angle to said second face.

3. In a stereoscopic system of the character described, that improvement which comprises providing a prism having an entrant face for receiving therethrough light rays from an object, a first reflecting face and a second reflecting face for dividing and reflecting the light rays passing through said entrant face, said second face being disposed at an angle of from approximately 174 degrees to less than 180 degrees to said first reflecting face and a third reflecting face for receiving and reflecting the light rays from said first and second faces, said third face being so angularly disposed with respect to said first and second faces as to cause said third face to reflect the light rays in a direction toward said second face and to a point of convergence outside of said prism.

4. In a stereoscopic system of the character described, a prism according to claim 3 in which a portion of said second reflecting face is adapted to serve as an emergent face for permitting the light rays reflected from said third face to pass therethrough.

5. In a stereoscopic system of the character described, a lens for transmitting light rays from an object, a prism, said lens being interposed between said object and said prism, said prism comprising an entrant face for receiving and passing therethrough the light rays transmitted from said lens, a first reflecting face for receiving and reflecting certain of the light rays from said lens, a second reflecting face for receiving and reflecting other light rays from said lens, said first and second faces being relatively angularly disposed at from approximately 174 degrees to less than 180 degrees, and a third reflecting face for receiving and reflecting the light rays reflected from said first and second faces, said third face being disposed at from approximately 18 degrees to approximately 36 degrees to said second face.

6. In a stereoscopic system of the character described, a lens for transmitting light rays from an object, a prism, said lens being interposed between said object and said prism, said prism comprising an entrant face for receiving and passing therethrough the light rays transmitted from said lens, a first reflecting face for receiving and reflecting certain of the light rays passing through said entrant face, a second reflecting face for receiving and reflecting other light rays passing through said entrant face, said first and second faces being relatively angularly disposed at from approximately 174 degrees to less than 180 degrees, and a third reflecting face for receiving and reflecting the light rays reflected from said first and second faces, said third face being disposed at an acute angle to said second face.

7. In a stereoscopic system of the character described, an optical arrangement comprising a first member for receiving and reflecting a series of light rays from an object, a second member for receiving and reflecting a second series of light rays from said object, said second member being disposed at an angle of from approximately 174 degrees to less than 180 degrees to said first member, and a third member for receiving and reflecting the light rays reflected from said first and second members, said third member being disposed at an acute angle to said second member.

8. In a stereoscopic system of the character described, an optical arrangement according to claim 7 in which the acute angle at which the third member is disposed with respect to the said second member ranges from approximately 18 degrees to approximately 36 degrees.

9. In a stereoscopic system of the character described, that improvement which comprises providing a prism having an entrant face for receiving therethrough light rays from an object, a first reflecting face and a second reflecting face for dividing and reflecting the light rays passing through said entrant face, said second face being disposed at an angle of from approximately 174 degrees to less than 180 degrees to said first reflecting face and a third reflecting face for receiving and reflecting the light rays reflected from said first and second faces, said third face being disposed at approximately 27 degrees to 36 degrees to said second face.

10. In a stereoscopic system of the character described, a lens for transmitting light rays from an object, a prism, said lens being interposed between said object and said prism, said prism comprising an entrant face for receiving and passing therethrough the light rays transmitted from said lens, a first reflecting face for receiving and reflecting certain of the light rays from said lens, a second reflecting face for receiving and reflecting other light rays from said lens, said first and second faces being relatively angularly disposed at from approximately 174 degrees to less than 180 degrees, and a third reflecting face for receiving and reflecting the light rays reflected from said first and second faces, said third face being disposed at from approximately 27 degrees to approximately 36 degrees to said second face.

11. In a stereoscopic system of the character described, an optical arrangement according to claim 7 in which the acute angle at which the third member is disposed with respect to the said second member ranges from approximately 27 degrees to approximately 36 degrees.

LOUIS F. BISCHOFF.